(12) United States Patent
Parker et al.

(10) Patent No.: US 11,171,724 B2
(45) Date of Patent: Nov. 9, 2021

(54) LIGHT-BASED COMMUNICATIONS SYSTEM

(71) Applicant: Marsupial Holdings, Inc., Waitsfield, VT (US)

(72) Inventors: William P. Parker, Waitsfield, VT (US); Jessica Lindle, Waitsfield, VT (US); Eric Gallo, Waitsfield, VT (US); Michael Strauss, Waitsfield, VT (US); Andrew Johnson, Waitsfield, VT (US)

(73) Assignee: Marsupial Holdinds, Inc., Waitsfield, VT (US)

( * ) Notice: Subject to any disclaimer, the term of this patent is extended or adjusted under 35 U.S.C. 154(b) by 0 days.

(21) Appl. No.: 16/628,386

(22) PCT Filed: Jul. 3, 2018

(86) PCT No.: PCT/US2018/040810
§ 371 (c)(1),
(2) Date: Jan. 3, 2020

(87) PCT Pub. No.: WO2019/010237
PCT Pub. Date: Jan. 10, 2019

(65) Prior Publication Data
US 2020/0220618 A1 Jul. 9, 2020

Related U.S. Application Data

(60) Provisional application No. 62/528,324, filed on Jul. 3, 2017.

(51) Int. Cl.
*H04B 10/00* (2013.01)
*H04B 10/116* (2013.01)
*H04B 10/112* (2013.01)

(52) U.S. Cl.
CPC ....... *H04B 10/116* (2013.01); *H04B 10/1123* (2013.01)

(58) Field of Classification Search
CPC .......................... H04B 10/116; H04B 10/1123
(Continued)

(56) References Cited

U.S. PATENT DOCUMENTS 5,150,248 A * 9/1992 Alfano ................... G02F 1/293
359/238

FOREIGN PATENT DOCUMENTS

CN 101350669 A 1/2009
EP 1858179 A1 * 11/2007 ............. H04B 10/10
(Continued)

OTHER PUBLICATIONS

State Intellectual Property, "Notification of the First Office Action", regarding China App No. 201880056939.6, dated Apr. 11, 2021.
(Continued)

*Primary Examiner* — Mohammad R Sedighian
(74) *Attorney, Agent, or Firm* — Shawn Gordon, Esq.; Dunkiel Saunders Elliott Raubvogel & Hand, PLLC

(57) ABSTRACT

Light-based deciphering and transmission of information from one remote party to another in line-of-sight is disclosed. The system speeds the pace of light-based transmissions, the decoding of transmissions, and improves the accuracy of reception of the transmissions. In certain embodiments, the system sends both visual and infrared light to send different types of information to the recipient or to send information under different conditions. Exemplary embodiments disclosed herein demonstrate three exemplary systems (mechanical, LCD, and LED) that are suitable for combination with the other components of the system as disclosed herein. In certain embodiments, the system is configured to focus on the correct light (when there are other lights in view) sending the code (e.g., Morse code or On-Off Keying) and track it.

25 Claims, 11 Drawing Sheets

(58) Field of Classification Search
USPC .......................................................... 398/172
See application file for complete search history.

(56) References Cited

FOREIGN PATENT DOCUMENTS

| | | |
|---|---|---|
| EP | 1858179 A1 | 11/2007 |
| GN | 204420886 U | 6/2015 |
| NL | 1010404 C2 | 10/1998 |

OTHER PUBLICATIONS

Janik, et al., "Retrroreflective Optical Communication", 2017 Conference On Microwave Techniques (COMITE), IEEE, Apr. 20, 2017.

Petitit, "Extended European Search Report", regarding EU App. No. 18827457.5, dated Jul. 5, 2021.

* cited by examiner

LIGHT-BASED COMMUNICATIONS SYSTEM

RELATED APPLICATION DATA

This application claims priority to U.S. Provisional Application No. 62/528,324 filed Jul. 3, 2017 and titled "Light-Based Communications System", which is incorporated by reference in its entirety.

FIELD OF THE INVENTION

The present invention generally relates to communication devices and relates with particularity to a light-based communications system wherein intelligence is transmitted from a first site to a second site by a modulated light beam.

BACKGROUND

In general, intelligence communications, i.e., communications used by the military, governments, or others not wanting to have their conversations intercepted or overheard, are typically secured voice communications through the use of a telephone or a radio or by light communication via Morse code light signals. Although the clack and flash of a signal lamp may not appear to be as useful as new digital communications, the simple device for sending Morse code messages using a search lamp fitted with shutters is in use by navies all over the world. The fact that it is a simple, low-tech system, is part of the reason it is still employed. Moreover, it cannot be jammed or tapped into, it works if the power supplies or satellite communications are knocked out, and it can be used for ship-to-ship communications even under the strictest of radio silence conditions.

A traditional signal lamp, signal lamp 10, is shown in FIG. 1. Signal lamp 10 includes a housing 14, a shutter 18, a light source 22, a power source 26, and a reflector 30. In operation, light source 22 is turned on and with the assistance of reflector 30, a high intensity beam of light 34 is emanated. An operator then opens shutter 18 to allow light to escape housing 14. Traditionally, shutter 18 is closed by a spring return (not shown). Particular operation of the signal lamp allows for the communication with far away persons.

Sending messages by signal lamp is fairly slow and requires that operators are proficient in Morse code. Special training is currently required in order to achieve the right speed and accuracy. For example, one standard requires: light on for 92 milliseconds (ms) is a dot; light on for 270 ms is a dash; the pause between dots, dashes should be 92 ms; the pause between letters should be 276 ms; and the pause between words should be 640 ms.

There is, thus, a need for a reliable light wave or other simple communications system which can be operated under adverse conditions by semiskilled personnel without the requirements of expensive and time-consuming setup and maintenance problems.

SUMMARY OF THE DISCLOSURE

In a first aspect, a light-based communications system is disclosed, the system comprising: a light transmitting device including a light source; a shutter system coupled to the light transmitting device; a computing device coupled to the shutter system, the computing device including a set of instructions to: receive a first set of information from a user; and control the shutter system so as to modulate the output of the light source in such a way so as to transmit the first set of information to a third-party.

In another aspect, a light-based communications system is disclosed, the system comprising: a light transmitting device; an LED light source coupled to the light transmitting device; a computing device coupled to the LED light source, the computing device including a set of instructions to: receive a first set of information from a user; and control the LED light source so as to modulate the output of LED light source in such a way so as to transmit the first set of information to a third-party.

In yet another aspect, a method of communicating using a light source is disclosed, the method comprising: providing a light transmitting device; entering a message to be sent to a distant third party into a computing device, the computing device in electronic communication with the light transmitting device; converting the message into a code suitable for transmission via light; and modulating the light transmitting device with the computing devices so as to send the code to the distant third party.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

A light-based communications system (hereinafter "system") described herein is able to use light (visual, infrared, etc.) to transmit information from one remote party to another in line-of-sight. The system speeds the pace of light-based transmissions, the decoding of transmissions, and improves the accuracy of reception of the transmissions. In certain embodiments, the system sends both visual and infrared light to send different types of information to the recipient or to send information under different conditions. Exemplary embodiments disclosed herein demonstrate three exemplary systems (mechanical, LCD, and LED) that are suitable for combination with the other components of the system as disclosed herein. In certain embodiments, the system is configured to focus on the correct light (when there are other lights in view), sensing the code (e.g., Morse code or On-Off Keying) or information, and tracking the light to maintain the communication line. In certain embodiments, the system can find and track the appropriate light during various conditions, such as, but not limited to, low light, daylight, night, inclement weather (stormy, foggy, etc.), long distance, movement of the sender relative to the receiver, rocking or movement of the sending or receiving vessels. In certain embodiments, the system, after receiving the light transmission, outputs a string of text, sentences, voice, computer files, or other data to the receiving operator or other user or into a memory. In certain embodiments, the system can prepare messages for sending via the light source and can control a shutter attached to the light source so as to send messages in code. In certain embodiments, the system can prepare, send, and receive messages simultaneously.

Figure 1:
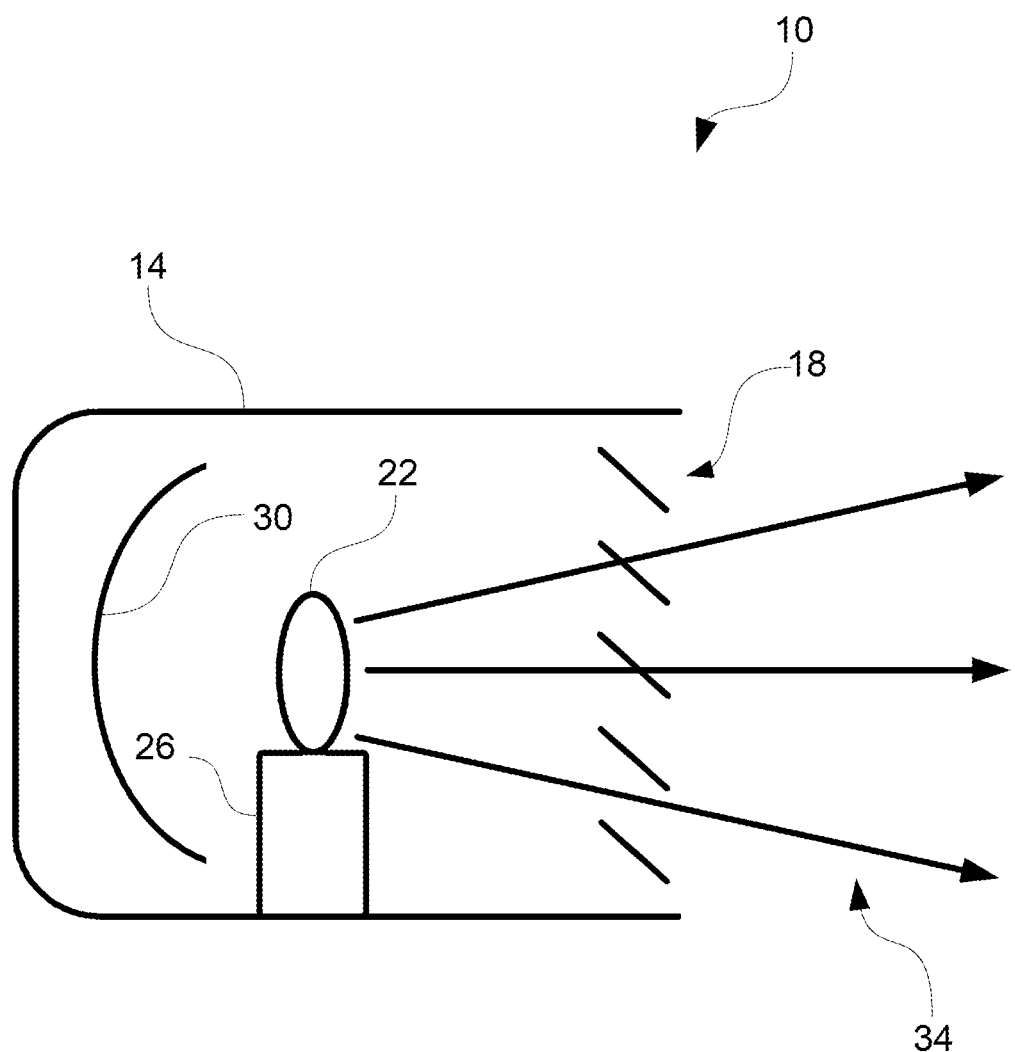
FIG. 1 is an illustration of a prior art signal lamp.
Figure 2:
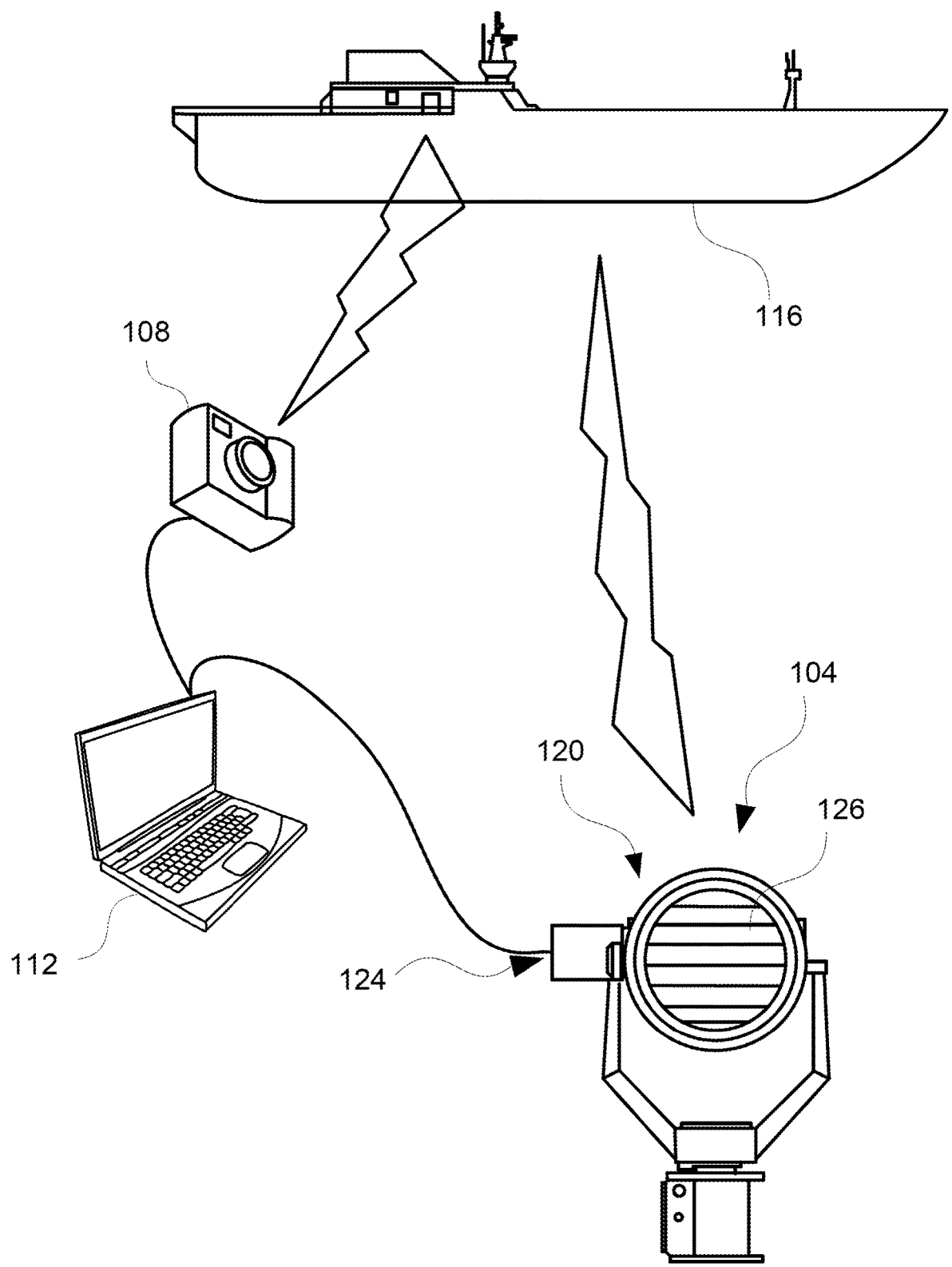
FIG. 2 is an illustration of a light-based communications system according to an embodiment of the present invention.

Turning now to FIG. 2, a light-based communications system, system 100, according to an embodiment of the present disclosure, is shown. System 100, at a high level, includes a light transmitting device 104, a receiver 108, and a computing device 112 (typically one for each of the operators of the transmission (sender and receiver)—in FIG. 1, one of the computing devices can be aboard ship 116). In use, system 100 facilitates coded communications between one or more remote parties, such as ship 116 and another vessel (not shown).

At a high level, system 100 is configured to transmit high intensity light that can be rapidly modulated so as to send a code, message, or other data (digital or analog) and to receive and decode messages. Generally, light transmitting device 104 is sized and configured to provide a high intensity, modulable light. In an embodiment, light transmitting device 104 is a signal lamp with a light beam divergence of between about 1 degree and about 6 degrees and about 1 million candlepower output. For embodiments of light transmitting device 104 disclosed herein a range of 10 miles can be expected in bright sunlight. At a high level, light transmitting device 104 includes light source (not shown in FIG. 2) (e.g., LEDs 304, FIG. 8) and shutter system 120.

The light source is sized and configured to provide a high intensity light that can extend significant distances with minimal divergence. The light source can be, but is not limited to, arc lamps, halogen bulbs, xenon bulbs, or light-emitting diodes, or other known or to be developed light sources. In an embodiment, system 100 uses at least some of the components of a traditional signal lamp, such as light source 22. In this embodiment, system 100 is a retrofit kit that enables current owners of signal lamps to modify the existing signal lamps to improve receiving and sending capabilities.

Shutter system 120 includes an operable mechanism 124 and a shutter 126, which are capable of at least partially dimming the light source so as to allow for the modulated signal coming from light transmitting device 104. Shutter system 120 can be a mechanical system, an electronic system, or a combination of the two.

Mechanical Shutter

In a traditional embodiment of a mechanical shutter (FIG. 1), shutter 18 is a mechanical system that is coupled to housing 14. Shutter 18 includes a manual opening lever (not shown) and an automatic closing mechanism (not shown), e.g., a spring, that returns the shutter to the closed position when no opening force is applied. At best, opening times of about 38 ms and closing times of about 56 ms can be expected for this traditional shutter.

Figure 3A:
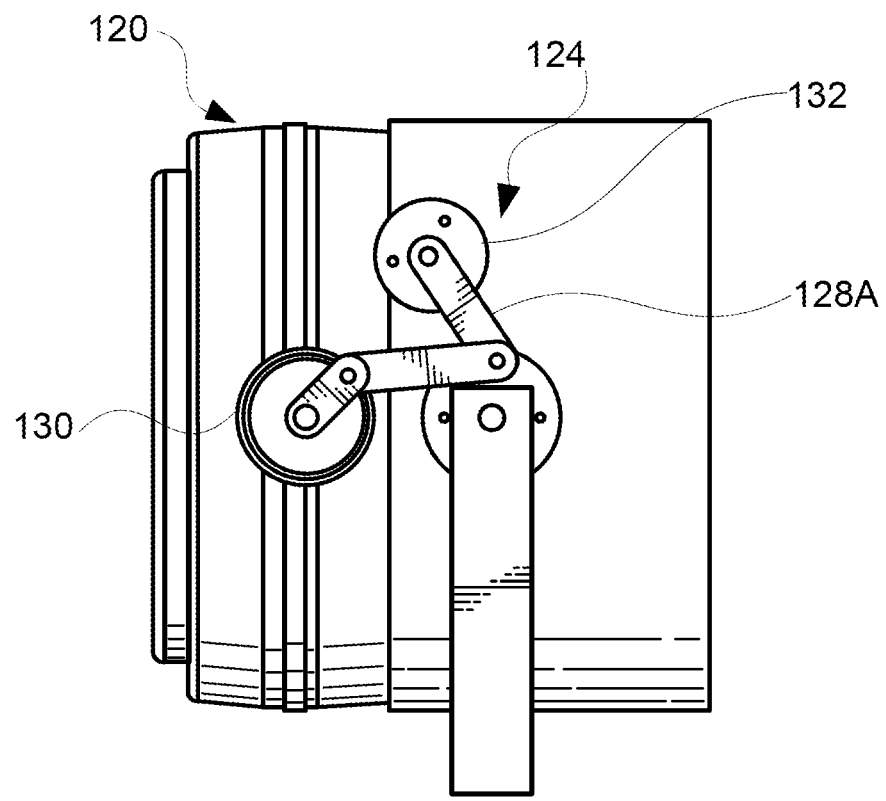
FIGS. 3A-B are side-views of a light transmitting device according to an embodiment of the present invention.
Figure 3B:
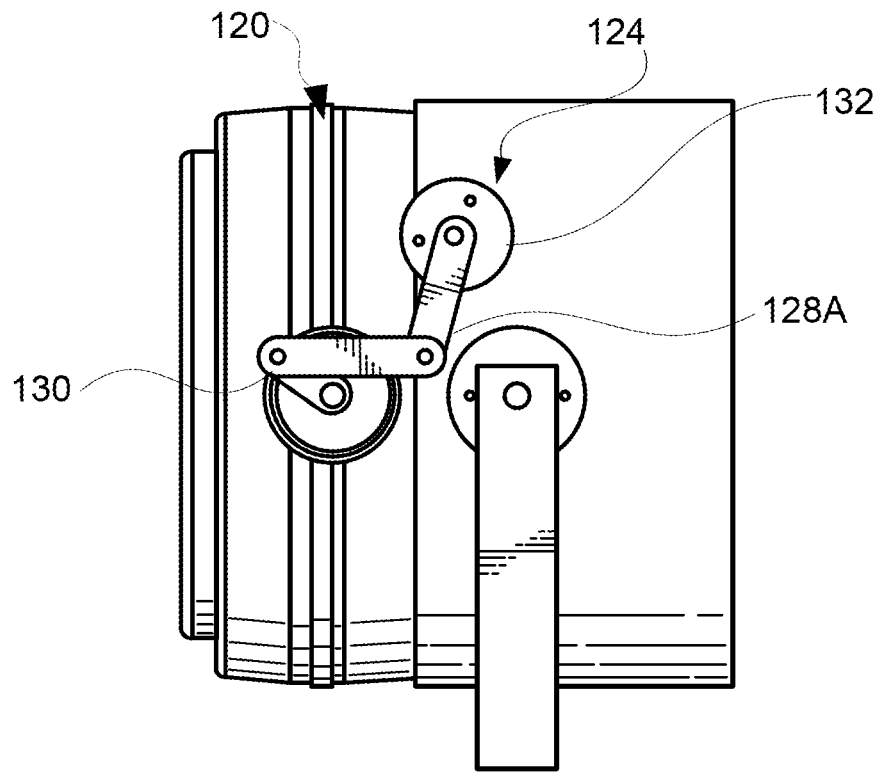
Figure 4A:
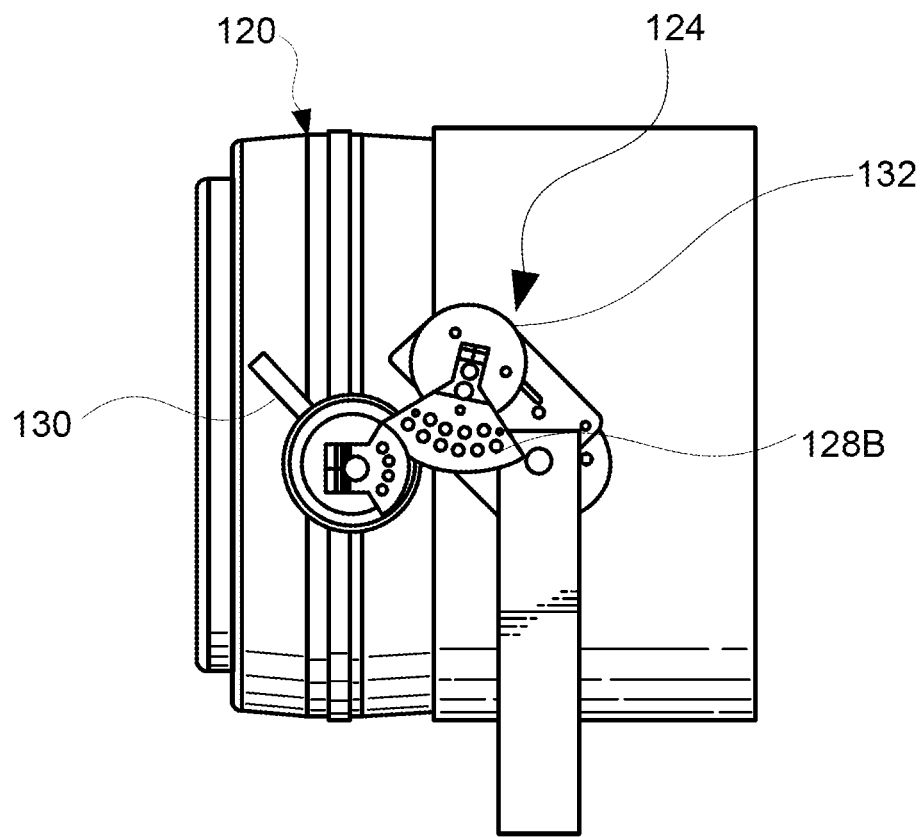
FIGS. 4A-B are side-views of another light transmitting device according to an embodiment of the present invention.
Figure 4B:
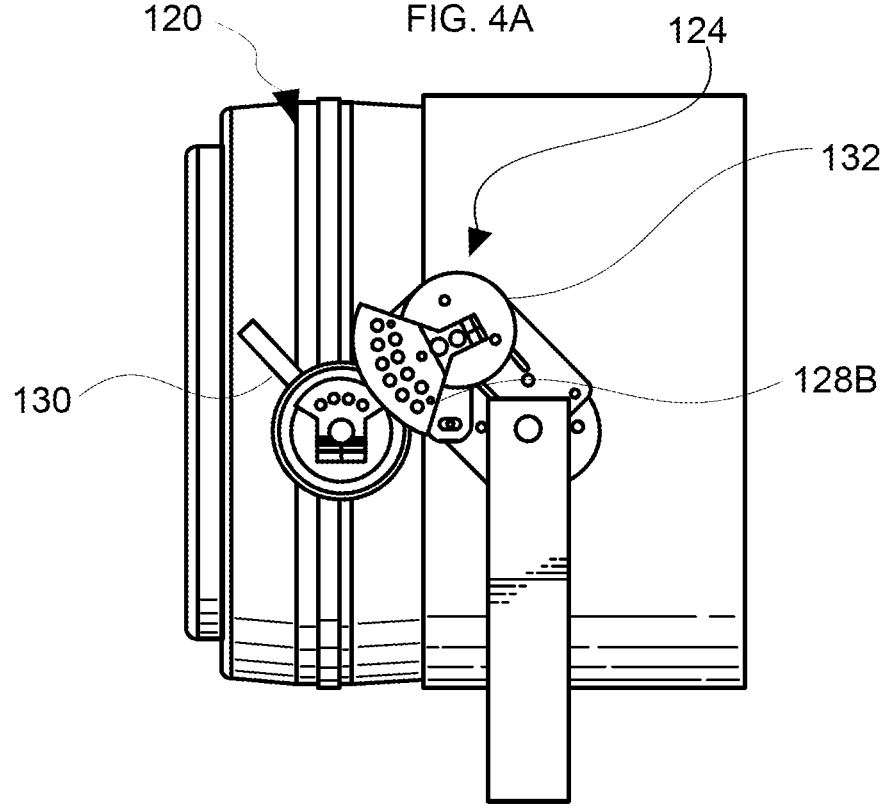

To improve upon the traditional mechanical shutter system in terms of shorter opening and closing times as well as eliminating of the need for direct human operation, shutter systems 120 are now disclosed with reference to FIGS. 3A-B and 3A-B. At a high level, shutter systems 120 are implemented as an operable mechanism 124 with couplings 128 (couplings 128A and 128B) to a lever 130 (note that shutters 126 (FIG. 2) are not shown so as to focus on operable mechanism 124, but would be similar to those show in FIG. 2). As shown in FIG. 3A, operable mechanism 124 includes a solenoid motor 132 mounted on a bracket (not shown). Solenoid motor 132 is attached to lever 130 by a lever coupling 128A. FIG. 3A shows the lever 130 in the closed position, while FIG. 3B shows lever 130 in the open position. In another embodiment, and as shown in FIG. 4A, shutter system 120 includes a solenoid motor 132 mounted on a bracket (not shown) attached to lever 130 by a gear coupling 128B. FIG. 4A shows the lever 130 in the closed position, while FIG. 4B shows lever 130 in the open position.

Solenoid motor 132 is sized and configured to apply the necessary torque to open shutter 126. In general, for traditional signal lamps, the necessary torque required to open a shutter is a maximum of about 5 in-lbs. Of course, larger or small motors 132 may be employed on other signal lamps depending on the torque required. In an embodiment, solenoid motor 132 is compact and provides the necessary speed and power necessary to modulate shutter 126 at a desired rate, e.g., about 5 Hz. In another embodiment, solenoid motor 132 is compact and provides the necessary speed and power necessary to modulate shutter 126 at a rate of about 10 Hz.

Operable mechanism 124, in an embodiment, can be operated via drive electronics (not shown) including, but not limited to, one or more relays, a power source, and a USB controller or micro-controller board. In operation, these components drive shutter 126 on and off using output pulses sent to solenoid motor 132. In the embodiments discussed above, solenoid motor 132 drives shutter 126 open and allows an existing pull-back spring (not shown) to return the shutter to the closed position. It should be noted that certain combinations of drive electronics can create significant vibrations within the signal lamp housing that can cause failure of the light source. Using controlled electronic drive signals can prevent knocking during opening and closing of shutter 126. Additionally or alternatively, mechanical stops can be employed to attenuate vibration.

For meaningful communication to occur, shutter 126 does not need to move from the fully open to fully closed positions as it does in traditional signal projectors. For example, shutter 126 can be moved from about 30% open to the almost open position for sufficient modulation/light dimming to occur. In some embodiments, shutter may be more open, e.g., 40% or 50%, and sufficient modulation may still occur. For example, if a receiver 108 has a threshold value for determining whether a light transmitting device is sending a code, e.g., 60% of expected light intensity, shutter 126 only has to close slightly below that threshold. If using solenoid motor 132, manual stops (not shown) can be employed that prevent shutter 126 from ever fully closing. Advantageously, the manual stops increase the overall speed of system 100 by limited the required range of motion.

Figure 5A:
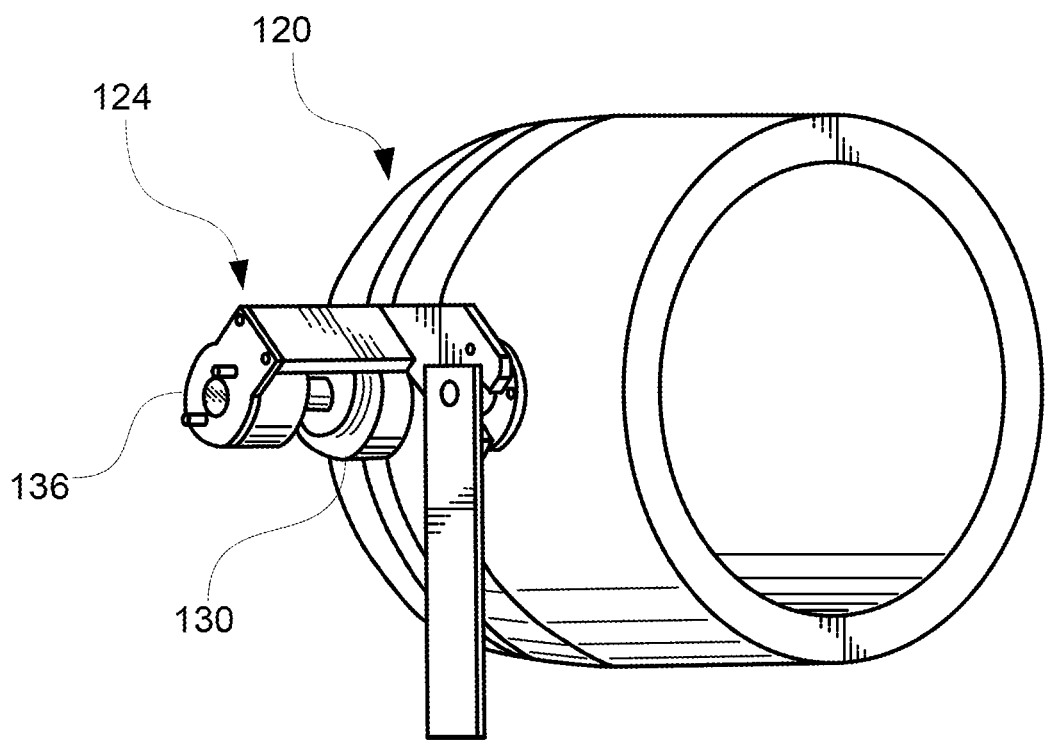
FIGS. 5A-B are side-views of another light transmitting device according to an embodiment of the present invention.
Figure 5B:
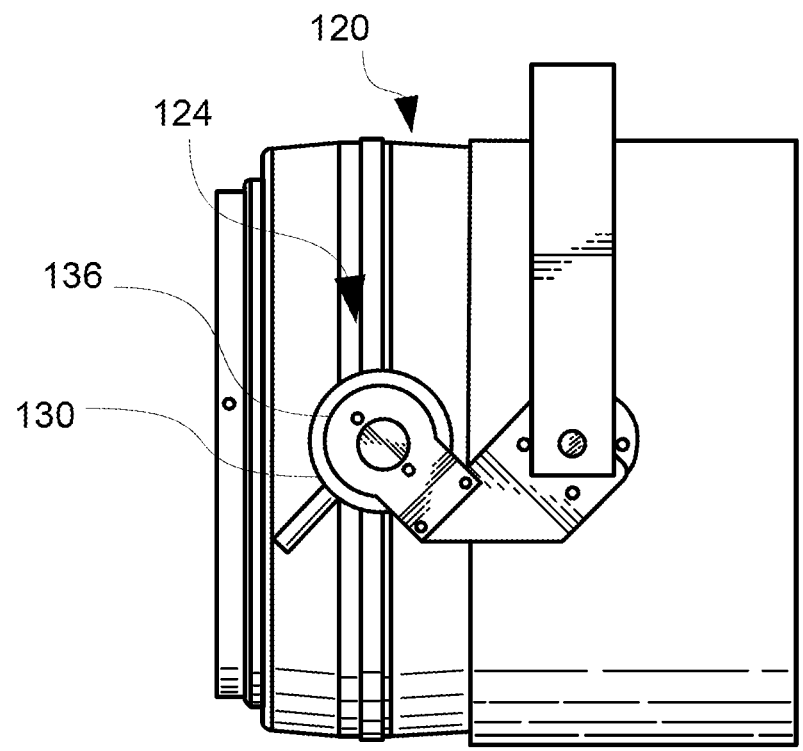
Figure 6:
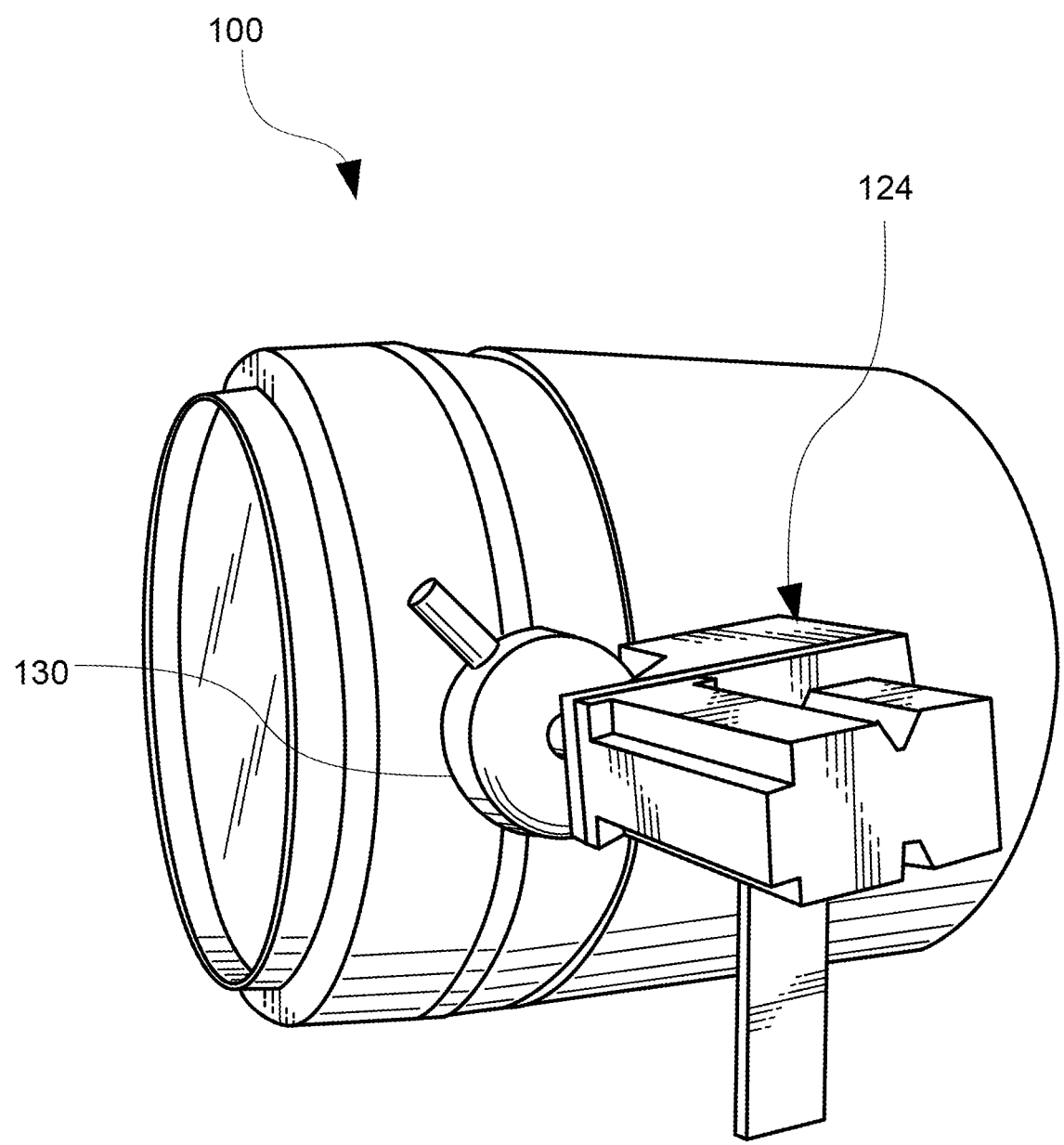
FIG. 6 is a perspective view of another light transmitting device according to an embodiment of the present invention.

In an embodiment, and as shown on FIGS. 5A, 5B, and 6, operable mechanism 124 includes a stepper motor 136, which allows for bi-directional force to be applied to shutter 126. Applying a bi-directional force (opening and closing force) to shutter 126 can speed up closing times while also allowing operational programming that can control the conditions of the opening and closing of the system. In an embodiment, stepper motor 136 allows for a minimum dot length of about 120 ms.

LCD Shutter

A liquid crystal display (LCD) shutter is an electronic shutter that either allows light to pass through the shutter or renders it opaque or blocked depending on the voltage applied. In an embodiment, an LCD shutter is coupled proximate the output of light transmitting device 104 so as to modulate optical output and thereby provide the necessary signaling capabilities. In operation, the LCD shutter can be either "open" (in its clear state) or "closed" (in its opaque state). Therefore, light transmitting device 104 can be toggled between its "on" and "off" state by applying a square wave drive voltage or similar electronic signal modulation to the LCD shutter. Typically, a "low" (or zero) input modulation signal opens the LCD shutter allowing light to pass while a "high" signal closes the shutter.

Figure 7:
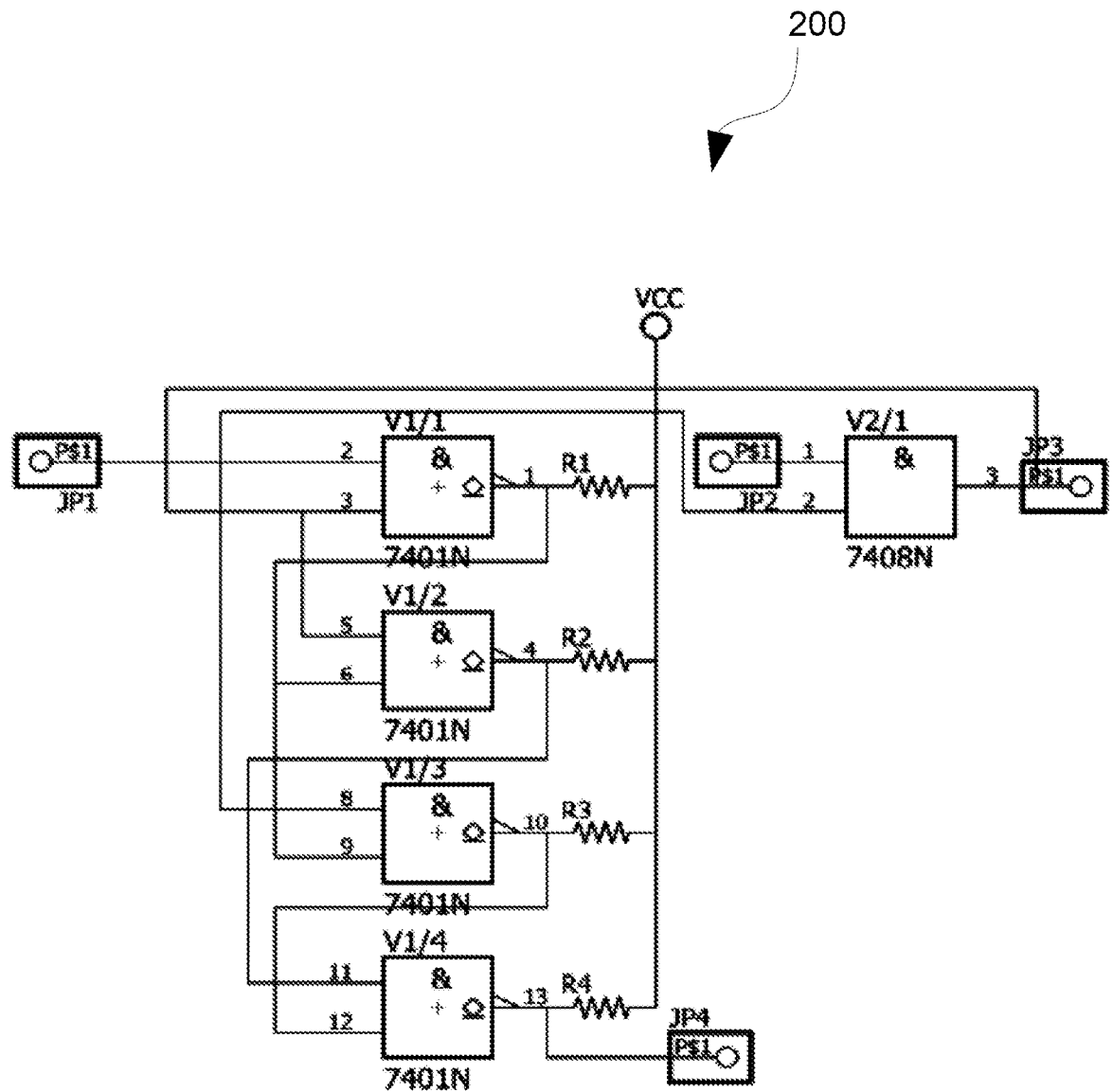
FIG. 7 is a schematic of a drive electronics according to an embodiment of the present invention.

FIG. 7 shows an exemplary drive circuit, circuit 200, for operating the LCD shutter, which modulates the 60 Hz carrier frequency driving the LCD display. Circuit 200 allows a digital output line with coded information (e.g., Morse code) to modulate the carrier frequency to turn the LCD shutter on and off. Circuit 200 provides a low resistance path between the signal lines so as to allow for rapid switching of the states of the LCD shutter. In this embodiment, two inputs, JP1 and JP2, are square wave inputs, where JP2 is a 60 Hz 5-volt peak-to-peak and JP1 is the modulation wave. JP2 is used as a carrier wave, thereby keeping the LCD shutter's charge fresh to avoid dimming or dark spots.

In an embodiment, the LCD shutter includes a dispersion component, which opens to become transparent or closes to disperse the light from light transmitting device 104. In this embodiment, the LCD shutter glows white while in the "off" state and the focused light beam from the light source is able to pass through it the "on" state. In an embodiment, the LCD shutter has a transparency, in the "on" state, of about 60%, and less than about 1% transparency in the "off" state.

The LCD shutter has latency that can be adjusted by signal voltage timing. For example, an increase in time to the "off" state and in rise time generally occurs as voltage is increased. However, using a modulated signal that adjusts voltage during the input pulse can improve rise and fall times of the LCD shutter. In an embodiment, a modulated signal provided an LCD shutter operates at about 5 Hz. Notably, fall time is the limiting factor in overall performance, as the removal of voltage results in relaxing of the liquid crystals rather than driving the closure of the shutter via an input signal. In many ways, this is similar to the spring return limitation found in mechanical shutter systems. To further improve upon liquid crystal fall times, in an embodiment, heat was applied which reduced overall liquid crystal fall times by about 20%.

The LCD shutter is generally susceptible to heat coming from the light source. Damage can include imaging the rear of the signal lamp into the shutter due to infrared waves. In an embodiment, the LCD shutter includes an IR mirror or blocking film to deflect outgoing IR thermal and IR wavelengths back into the signal lamp before hitting the LCD shutter and providing an air gap stand-off for the LCD shutter from the signal lamp frame to avoid thermal damage.

As with one or more of the mechanical shutter systems disclosed herein, the LCD shutter can mount to existing points on an OEM signal lamp, such as signal lamp 10, enabling the LCD shutter to be installed and removed quickly by a user. In an embodiment, drive cabling connects to an electronics package that powers and controls the LCD shutter via computing device 112 and suitable drive electronics.

In an embodiment, an LCD shutter provides low contrast signaling up to a 50 ms dot length. Low contrast signals are signals where the shutter does not turn fully on or off, e.g., the signal dims, but still supplies a signal to the light receiver suitable for code transmission and is viewable by eye.

Flashing LED

Figure 8:
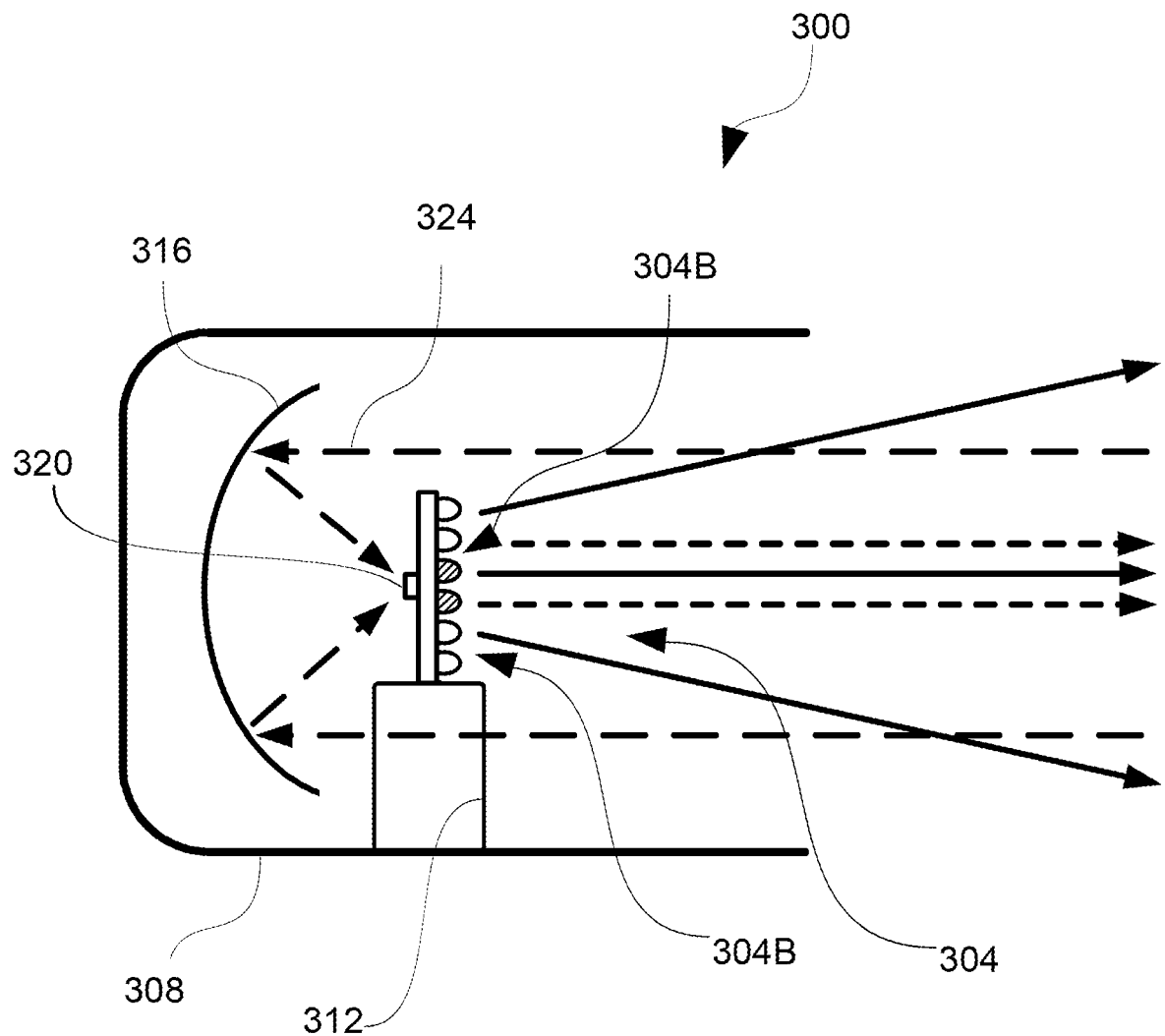
FIG. 8 is an illustration of another light transmitting device according to embodiment of the present invention.

As shown in FIG. 8, another embodiment of light transmitting device, light transmitting device 300, includes LEDs 304 as the light source instead of a halogen or other light sources. In this embodiment, in addition to LEDs 304, light transmitting device 300 includes a housing 308, LED drive electronics 312, a reflector 316, and a receiver 320. LEDs 304 can be both visible light emitting diodes 304A and IR emitting diodes 304B (or ultra-violet emitting diodes), which enable light transmitting device 300 to send multiple types of code signals, disparately or simultaneously. In contrast to other light transmitting devices disclosed herein, no physical or electronic shutter is required for light transmitting device 300 as LEDs 304 can be modulated by drive electronics 312. Drive electronics 312 can be adjusted to condition output signaling to account for the rise and fall times of the flashing LEDs 304. In an embodiment, LEDs 304 are switched on and off using an opto-isolated TTL signal input, which provides rise and fall times of about 5 ms. Receiver 320 can be a photodiode that receives incoming visible light and IR signals 324 reflected off of reflector 316. Additional embodiments and discussion of receiver, such as receiver 320, are discussed in more detail below.

Housing 308 and reflector 316 can be substantially similar to the OEM signal lamp (e.g., signal lamp 10 of FIG. 1) or can be custom designed to work with the other components of light transmitting device 300. Preferably, LEDs 304, drive electronics 312, and receiver 320 are sized and configured to fit within an existing housing assembly, such as housing assembly 14 (FIG. 1).

Returning now to FIG. 2, receiver 108 receives light (visible and/or IR) and transmits the received signals to computing device 112. In an embodiment, receiver 108 is a camera (e.g., video camera, USB camera, GoPro®, etc.), photodiode, IR detector, etc., that receives light signals so as to create a data file of information based upon the signals. In certain embodiments, the data file may be a set of frames and receiver 108 and/or computing device 112 can separate the file into frames and compare the intensity of light in each of the still images. By comparing the intensity, a digital signal of the flashing light can be extracted and the code deduced. In an embodiment, a threshold is established to determine if the light generating the code is on or off, e.g., a 60% intensity threshold. Along with this binary state (on vs. off), how long the given state exists is monitored. This allows computing device 112 (which operates preprogrammed routines to evaluate the incoming data—discussed more fully below) to determine if it is a long flash (dash), a short flash (dot), or a no-flash period that separates Morse characters, or English letters and words. Once the digital signal is translated into Morse code, it can be translated into English (or any other language).

In an embodiment, receiver 108 (with or without computing device 112) is capable of tracking the image, or more specifically, the light source. A benefit of image tracking is that signaling parties, e.g., ships, do not remain static with respect to each other's position and users may not precisely track the signaling light of the other ship. In an embodiment, receiver 108 is configured to identify signaling light sources to track the light source so as to account for motion between the system, e.g., ship movement due to waves. In an embodiment, where receiver 108 is a camera or similar device, tracking of incoming light can occur by having the image processing software "lock" onto the flashing light in the image using object tracking algorithms. The light can then be isolated and filtered using digital signal processing. In another embodiment, a single pixel detector is used. In this embodiment, a wide field of view is preferred and signal processing software extracts the known modulation of the signal (variance in the designed brightness, e.g., full intensity to 30% intensity) from the background noise of the detector. In another embodiment, a mechanical pan/tilt system can be included with either of the previous two methods just described, where feedback is used to mechanically steer the system for coarse tracking of the receiver to improve the received signal. The mechanical pan/tilt may be especially useful in long range and/or situations where the ships are pitching and rolling significantly.

Computing device 112 allows for the deciphering and transmission of coded messages, among other functions as discussed herein. In an embodiment, computing device 112 is electronically coupled to receiver 108 so as to receive information, related to light signals received by receiver 108, and is electronically coupled to light transmitting device 104 so as to allow for the transmission of messages. In an embodiment, computing device 112 allows users to input text or to choose from a standard message set for transmission. Upon entering the message, computing device 112 translates the message to a coded framework, e.g., Morse code, and then communicates with shutter system 120 (or LED driver electronics), thereby driving the mechanical or LCD shutters or LEDs based on coded framework. In an embodiment, computing device 112 is configured to identifying signal sources in the presence of different lighting conditions, distinguishing a signal source from other blinking lights in view, and extracting the necessary operating parameters such as speed, duty cycle, and other aspects that enable communication with multiple and varying communicators. In an embodiment, computing device 112 provides real time character display of received signals, achieving the same basic messaging paradigm of a human translator and enabling faster response times for the user on the receiving end. In an embodiment, computing device 112 is configured to operate under severe operating conditions, e.g., to be able to extract signal sources with varying contrast ratios, imprecise signal timing, possible signaling mistakes, and other real-world scenarios.

Computing devices 112 disclosed herein are configured to address image stabilization, tracking, and monitoring of incoming signals; image processing and translation of codes being sent by the light transmitters; adjustments for distance and light conditions; and provide for a usable user interface to facilitate communications. Computing device 112 can identify flashing lights by, for example, using dewarping algorithms with background subtraction and blob detection to store any sequences of lights.

Figure 9:
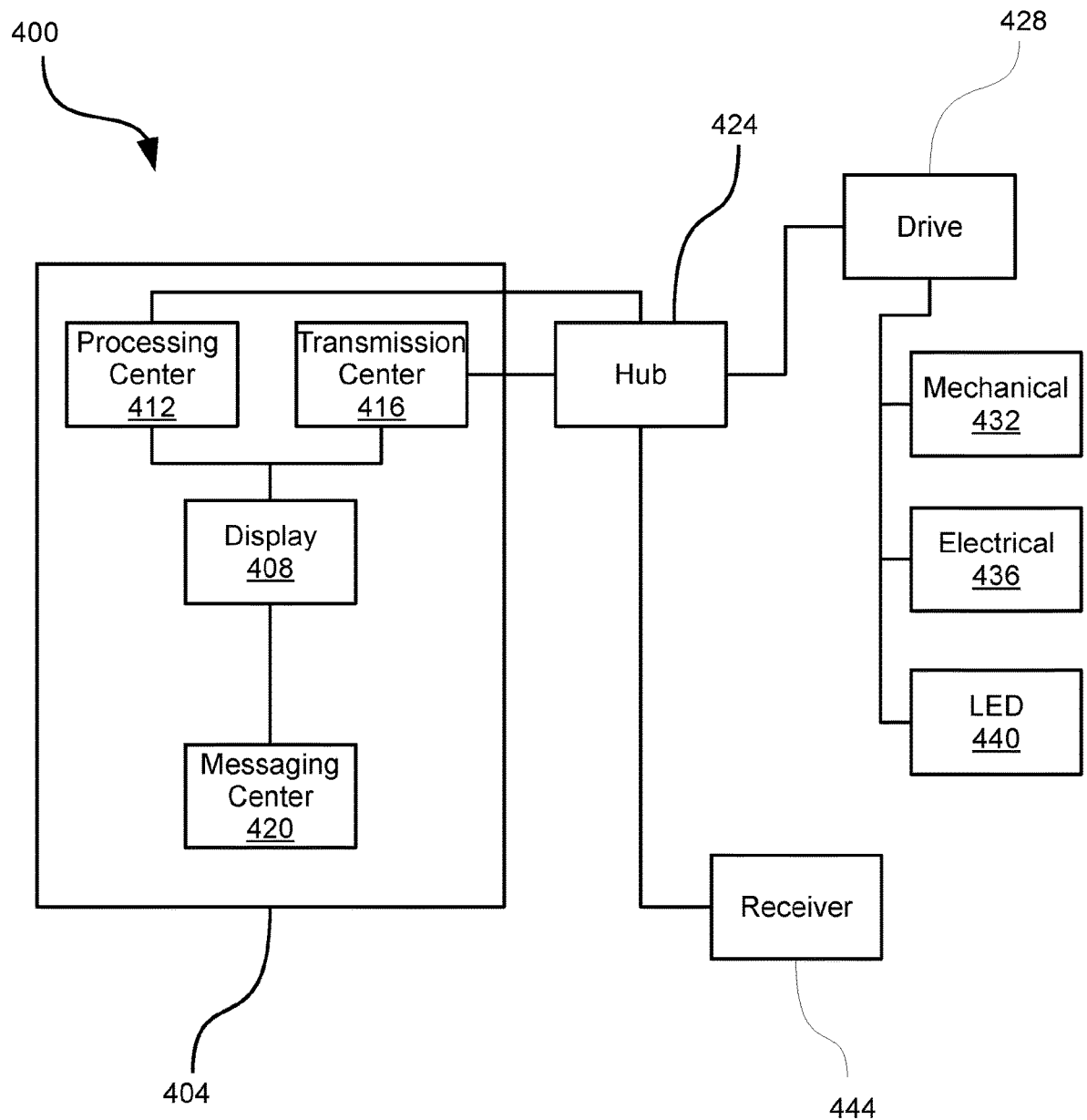
FIG. 9 is a block diagram of a light-based communication system according to an embodiment of the present invention.

Turning now to FIG. 9, there is shown a block diagram of a light-based communications system 400 according to an embodiment of the present disclosure. In this embodiment, a computing device 404, includes a display 408, a processing center 412, a transmission center 416, and a messaging center 420. Computing device 404 is coupled to a hub 424, which is concomitantly coupled to a drive 428, which operates a desired shutter system, i.e., mechanical 432, electronic 436, and LED 440, as well as receiver 444. Drive 428 can include necessary components (e.g., electronic drive circuits) to drive each of the various shutter types or the flashing LEDs described herein. Drive 428 receives information from computing device 404 indicating which to use and directs the signal to the appropriate shutter. The components of system 400 work together to send and receive light-based communications.

Messaging center 420 serves to allow and operator to review received messages and to send messages via system 400. Messaging center 420 can be implemented so as to automatically interpret initiation signals and enforce messaging protocols. In an embodiment, the information received, i.e., information representing the duration of light on vs. light off, comes from receiver 444, through hub 424 to processing center 412, which analyzes the information and develops a derivative trace of the information. In this embodiment, the Morse code dots, dashes, and spaces are more easily identifiable as each character takes on an easily identifiable shape within the derivative trace which may be more difficult to decipher using the raw data. Advantageously, these techniques eliminate the slowly fluctuating DC bias within the signal which may be a source of error.

Transmission center 416 serves to translate the message that an operator wishes to send from the language used by the operator to Morse code or other coded language. In an embodiment, an operator enters a message using display 408 and/or messaging center 420, which is then translated by transmission center 416 and subsequently sent to drive 428 for communication using one of the shutter systems or the LED system.

Returning broadly to FIG. 2, system 100 (or system 400) may be provided as an add-on system or kit to an already existing signal lamp. For the mechanical shutter, a user can affix the operable mechanism 124 to the side of a signal lamp so as to engage lever 130. For the electronic shutter, i.e., the LCD shutter, a user can affix the electronic shutter proximate the front of a signal lamp with preferably a non-permanent, attachable bracket. For either kit, the user can also affix a wide-angle camera proximate the signal lamp using magnets or similar releasable couplings and then point the camera at the intended party with which the user intends to communicate. The user then opens the shutter on the signal lamp and readies it. The user then activates the messaging application on a tablet computer or similar device, ensures the camera can see the other party, and verifies operation of the shutter. To send messages, the user simply types the message to be sent into computing device 112, or chooses from a list preset messages, and hits the "SEND" (or similar) button on the application. Computing device 112 will then control the shutter to send the message to the other party/ship. Once transmitted, the completed message will be recorded in the list of transmitted and received messages displayed within the software application on computing device 112 or other host computing device, such as, but not limited to, a desktop computer, embedded computer, virtual machine, personal data assistant, smart phone, thin client terminal, and/or any other suitable device that can execute the software. To receive messages, the user waits for a message to be sent, which will be captured by receiver 108. Image processing software included with computing device 112 will "lock" onto the other ship's signaling lamp, detect the flashing lights, and convert the messages into plain text within the software application, using, for example, processing center 412.

Figure 10:
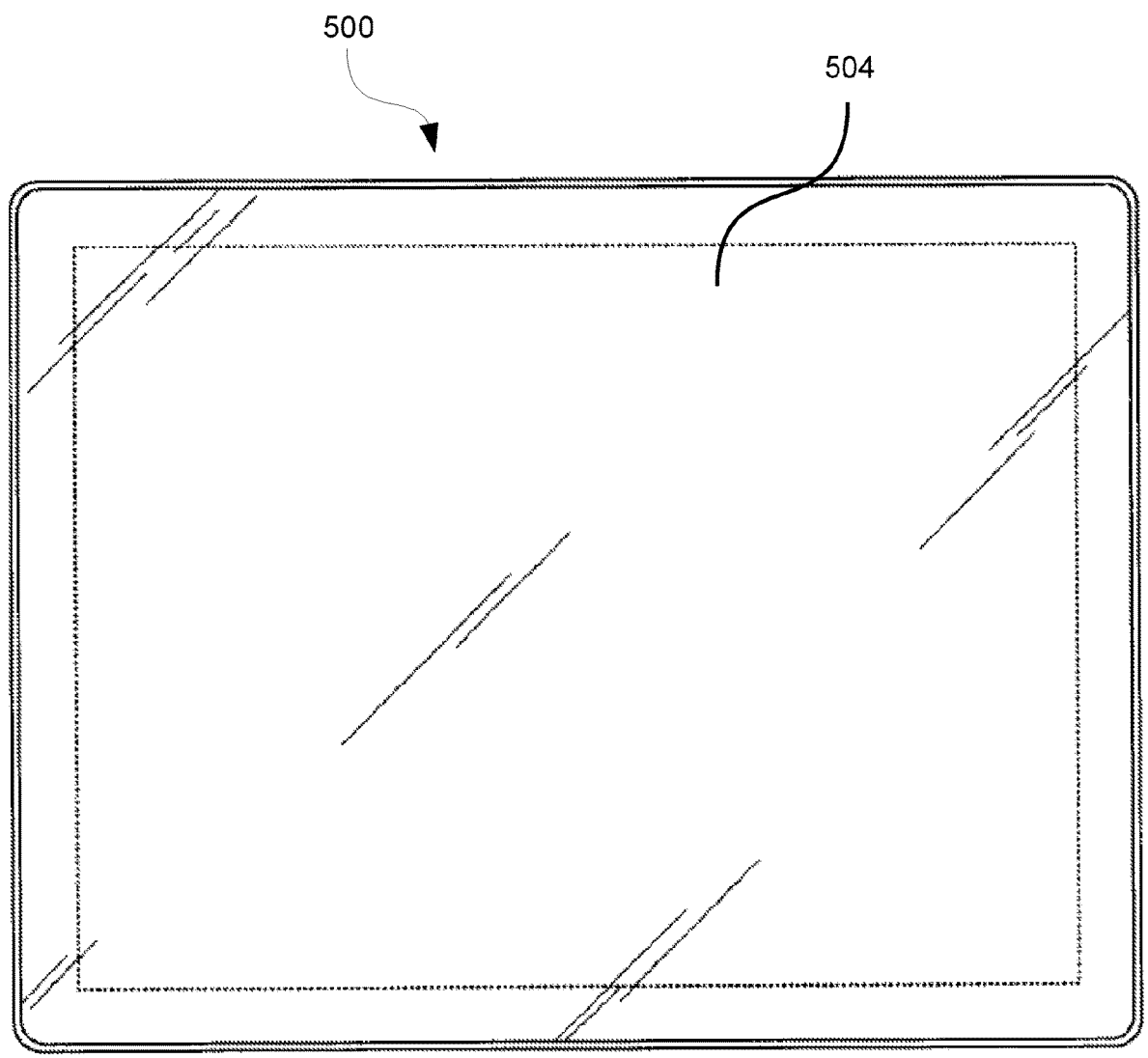
FIG. 10 is an illustration of a computing device according to an embodiment of the present invention.

Turning now to FIG. 10, there is shown an implementation of a computing device 500 suitable for use with system 100 or 400. A display portion 500 of computing device 112 can include a touch-sensitive display 504, an input device, a speaker, and a transceiver, among other components. Touch-sensitive display 504 is sometimes called a "touch screen" for convenience and may also be known as or called a touch-sensitive display system. Touch screen 504 can be used to display information or to provide user-interface objects (e.g., virtual (also called "soft") control keys, such as buttons or keyboards), thereby providing an input interface and an output interface between computing device 112 and a user. Information displayed by touch screen 504 can include graphics, maps, text, icons, video, and any combination thereof (collectively termed "graphics"). In an embodiment, and in use with system 100, a user can input into computing device 112 using a virtual keyboard to enter messages for sending to another party via light transmitting device 104. A user can also determine which shutter system 120 to use in the event that both mechanical and electronic shutters are available.

Touch screen 504 has a touch-sensitive surface, which uses a sensor or set of sensors to accept input from the user based on haptic and/or tactile contact. Touch screen 504 may use LCD (liquid crystal display) technology, or LPD (light emitting polymer display) technology, although other display technologies may be used in other embodiments. Touch screen 504 can detect contact (and any movement or breaking of the contact) on the touch screen and converts the detected contact into interaction with user-interface objects (e.g., one or more soft keys, icons, web pages or images) that are displayed on the touch screen. Touch screen 504 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 504. In an exemplary embodiment of the use of computing device 112, a user presses a finger to touch screen 504 so as to initiate contact. In alternative embodiments, a user may make contact with touch screen 504 using any suitable object, such as, but not limited to, a stylus.

An input device can facilitate navigation among and interacts with one or more user-interface objects displayed in the touch screen 504. In an embodiment, the input device can be a click wheel that can be rotated or moved such that it can be used to select one or more user-interface objects displayed on touch screen 504. In an alternative embodiment, the input device can be a virtual click wheel, which may be either an opaque or semitransparent object that appears and disappears on the touch screen display in response to user interaction with computing device 112. In another embodiment, the input device is a microphone that allows computing device 112 to be responsive to user voice commands and to receive/record audio/sounds. More than one input device may be included with computing device 112 so that more than one type of interaction with the computing device is available.

A transceiver receives and sends signals from computing device 112. In an embodiment of computing device 112, the transceiver sends and receives radio frequency and/or wired signals through one or more communications networks, such as a network, and/or other computing devices. The transceiver may be combined with well-known circuitry for performing these functions, including, but not limited to, wired connectors, a networking chipset, an antenna system, one or more amplifiers, a tuner, one or more oscillators, a digital signal processor, a CODEC chipset, a subscriber identity module (SIM) card, and a memory. The transceiver may communicate with one or more networks, such as the Internet, also referred to as the World Wide Web (WWW), an intranet and/or a wireless network, such as a cellular telephone network, a wireless local area network (LAN), and/or a metropolitan area network (MAN), and other devices. Computing device 112 may use any of a plurality of communications standards to communicate to networks or other devices using radio frequency or wired setups with the transceiver. Communications standards, protocols and technologies for communicating using radio frequencies include, but are not limited to, Ethernet, RS-232, RS-422, RS-485, Transmission Control Protocol (TCP), User Datagram Protocol (UDP), Internet Protocol (IP), fiber optic, and/or fiber channel, or any other suitable communication protocol. Communications standards, protocols and technologies for communicating using radio frequencies or other wireless methods include, but are not limited to, Global System for Portable Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Near Field Communication (NFC), Wireless Fidelity (Wi-Fi) (e.g., IEEE 802.11a, IEEE 802.11b, IEEE 802.11g and/or IEEE 802.11n), Optical wireless communications (OWC), acoustical data transmission (ADT) (e.g., ultrasonic data modem), voice over Internet Protocol (VoIP), Wi-MAX, a protocol for email (e.g., Internet message access protocol (IMAP) and/or post office protocol (POP)), instant messaging, e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), or any other suitable communication protocol. The transceiver may also be configured to assist computing device 112 in determining its current location and other information, such as time.

Computing device 112 may also include other applications or programs such as, but not limited to, word processing applications, JAVA or other cross-platform-enabled applications, encryption, digital rights management, voice recognition, voice transliteration, voice replication, image capture, image processing, signal capture, signal processing, signal enhancement, and a browser module. The browser module may be used to browse the Internet, including searching, linking to, receiving, and displaying web pages or portions thereof, as well as attachments and other files linked to web pages.

It should be appreciated that the computing device 112 is only one example of the computing device that may be used with the present system and method, and that the computing device may have more or fewer components than mentioned, may combine two or more components, or a may have a different configuration or arrangement of the components. In the present system and method, computing device 112 may be implemented with any computing device that includes timestamp functionality and is not so large that it is very inconvenient to move it from one location to another. Thus, computing device 112 is not restricted to a smartphone or other hand-held device, and may include pad or tablet computing devices, smart books, net books, laptops, and even larger computing devices with geolocation functionality that may be moved from one location to another without significant inconvenience.

Figure 11:
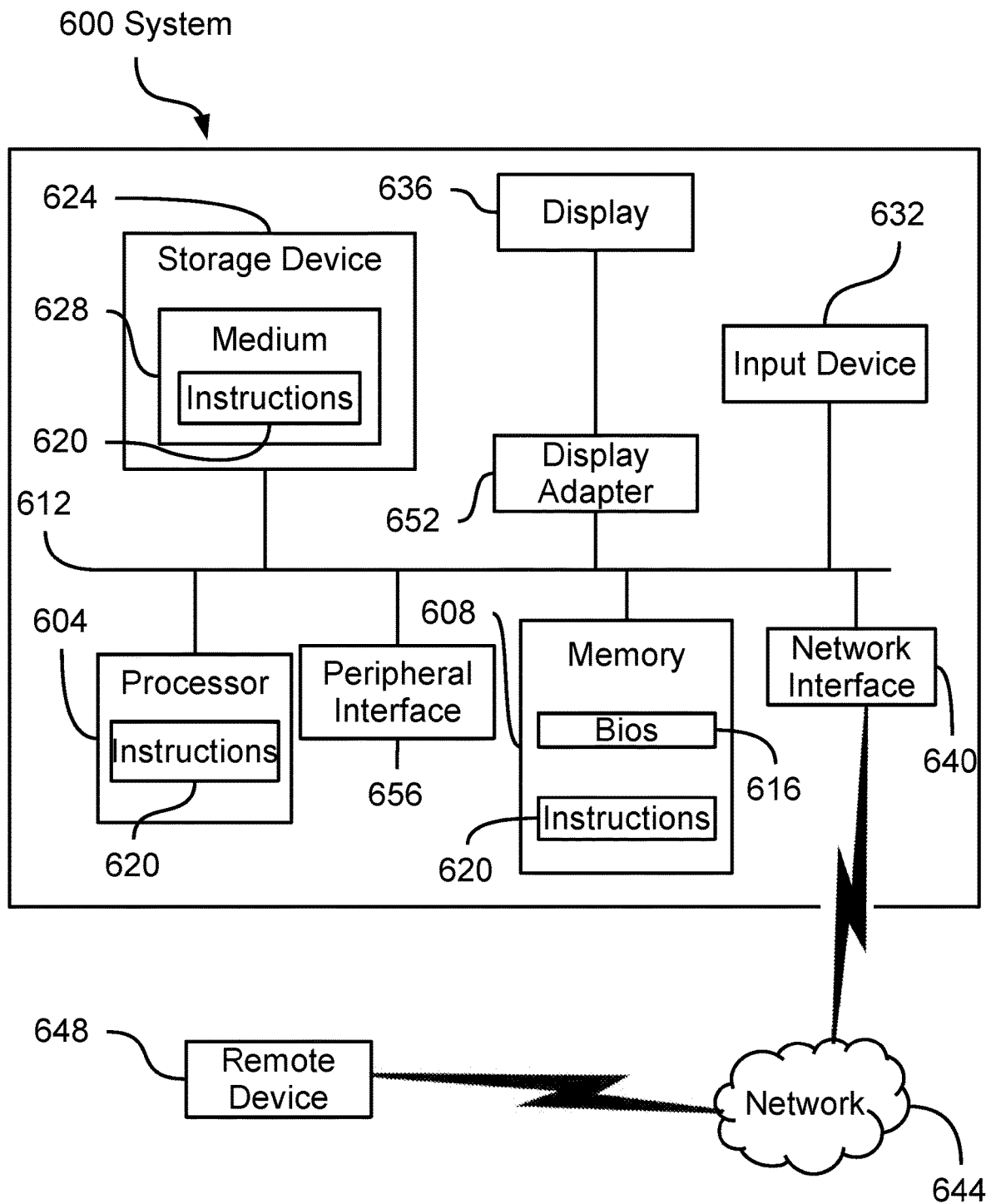
FIG. 11 is a block diagram of a computing system suitable for use with the light-based communication systems described herein.

FIG. 11 shows a diagrammatic representation of one embodiment of a computing device in the exemplary form of a computer system 600 within which a set of instructions for causing a computing device, such as computing device 112 or computing device 404, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 616 (BIOS), including basic routines that help to transfer information between elements within computer system 600, such as during start-up, may be stored in memory 608.

Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof. Memory 608 may include a messaging program suitable for a user to enter messages that can then be suitably converted for transmission via light transmitting device 104.

Computer system 600 may also include a storage device 624. Examples of a storage device (e.g., storage device 624) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 624 may be connected to bus 612 by an appropriate interface (not shown). Example interfaces include, but are not limited to, Small Computer System Interface (SCSI), Integrated Device Electronics (IDE), advanced technology attachment (ATA), serial ATA (SATA), External SATA (eSATA), SATA Express, U.2, M.2, Non-Volatile Memory Express (NVMe), universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen (as described with reference to FIG. 10), gesture recognition (e.g., hand signals and motions using a camera or inertial measurement unit), eye tracking (e.g., eye gazing and blinking), and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above. Input device 632 may also include sensors, such as a light or photodiode sensors as discussed above. The output of the sensors can be stored, for example, in storage device 624 and can be further processed to provide, for example, analysis of the clamp force value over time, by processor 604.

A user may also input commands and/or other information to computer system 600 via storage device 624 (e.g., a removable disk drive, a flash drive, etc.) and/or network interface device 640. A network interface device, such as network interface device 640 may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a satellite network (e.g., a worldwide provider of data and/or voice via satellite links), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, near to eye display (NED), plasma display, laser illuminated, and any combinations thereof. Display adapter 652 and display device 636 may be utilized in combination with processor 604 to provide a graphical representation of a utility resource, a location of a land parcel, and/or a location of an easement to a user. In addition to a display device, a computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

In an embodiment, a light-based communications system comprises: a light transmitting device including a light source; a shutter system coupled to the light transmitting device; a computing device coupled to the shutter system, the computing device including a set of instructions to: receive a first set of information from a user; and control the shutter system so as to modulate the output of the light source in such a way so as to transmit the first set of information to a third-party. Additionally or in the alternative, wherein the shutter system is one of a mechanical shutter or an electronic shutter. Additionally or in the alternative, wherein the light transmitting device includes a housing for containing the light source, and wherein the shutter system includes a shutter, a lever coupled to the shutter, the lever operable between an open state and a closed state, and an operable mechanism coupled to a lever, the operable mechanism in electronic communication with the computing device. Additionally or in the alternative, wherein the operable mechanism is a solenoid motor. Additionally or in the alternative, wherein the operable mechanism includes a coupling, the coupling mechanically engaging the solenoid motor with the lever. Additionally or in the alternative, wherein the coupling is a coupling lever. Additionally or in the alternative, wherein the coupling is a gear coupling. Additionally or in the alternative, wherein the operable mechanism is a stepper motor. Additionally or in the alternative, wherein the shutter system includes an LCD shutter. Additionally or in the alternative, wherein the LCD shutter includes a dispersion shutter. Additionally or in the alternative, wherein the light transmitting device includes an IR reflector, the IR reflector disposed between the light source and the LCD shutter. Additionally or in the alternative, wherein the shutter system uses drive electronics to modulate the light source. Additionally or in the alternative, wherein the shutter system operates a shutter between an open state and an about 30% open state. Additionally or in the alternative, further including a receiver in electronic communication with the computing device, the receiver configured to ascertain the existence of a light signal, the light signal representative of coded information. Additionally or in the alternative, wherein the receiver determines the existence of a light signal based upon the brightness of the signal and wherein the receiver tracks the light signal once identified. Additionally or in the alternative, wherein the shutter system is a flashing LED set. Additionally or in the alternative, wherein the flashing LED set includes visual light LEDs, ultra-violet LEDs, and/or infrared LEDs. Additionally or in the alternative, wherein the flashing LED set includes a photodiode coupled to the rear receiver of the flashing LED set. Additionally or in the alternative, wherein the computing device simultaneously sends and receives coded messages via the light transmitting device.

A light-based communications system comprising: a light transmitting device; an LED light source coupled to the light transmitting device; a computing device coupled to the LED light source, the computing device including a set of instructions to: receive a first set of information from a user; and control the LED light source so as to modulate the output of LED light source in such a way so as to transmit the first set of information to a third-party. Additionally or in the alternative, wherein the LED light source includes two or more types of LEDs chosen from the list of: of visible light LEDs, ultra-violet LEDs, and infrared LEDs. Additionally or in the alternative, wherein the first set of information includes two sets of code, each set of code to be transmitted by a respective one of the types of LEDs. Additionally or in the alternative, further including a drive electronics, the drive electronics providing a rise and a fall time for the LED light source of about 5 ms. Additionally or in the alternative, further including a receiver, wherein the receiver is coupled to the rear of the LED light source. Additionally or in the alternative, wherein the receiver is a photodiode. Additionally or in the alternative, wherein the receiver is configured to ascertain the existence of a light signal, the light signal representative of coded information. Additionally or in the alternative, wherein the receiver determines the existence of a light signal based upon the brightness of the signal and wherein the receiver tracks the light signal once identified. Additionally or in the alternative, wherein the computing device simultaneously sends and receives coded messages via the light transmitting device.

A method of communicating using a light source, the method comprising: providing a light transmitting device; entering a message to be sent to a distant third party into a computing device, the computing device in electronic communication with the light transmitting device; converting the message into a code suitable for transmission via light; and modulating the light transmitting device with the computing devices so as to send the code to the distant third party. Additionally or in the alternative, wherein the modulating is accomplished by using a shutter system. Additionally or in the alternative, wherein the shutter system is one of a mechanical shutter or an electrical shutter. Additionally or in the alternative, wherein the light transmitting device includes a housing for containing the light source, and wherein the shutter system includes a shutter, a lever coupled to the shutter, the lever operable between an open state and a closed state, and an operable mechanism coupled to a lever, the operable mechanism in electronic communication with the computing device. Additionally or in the alternative, wherein the operable mechanism is a solenoid motor. Additionally or in the alternative, wherein the operable mechanism includes a coupling, the coupling mechanically engaging the solenoid motor with the lever. Additionally or in the alternative, wherein the coupling is a coupling lever. Additionally or in the alternative, wherein the coupling is a gear coupling. Additionally or in the alternative, wherein the operable mechanism is a stepper motor. Additionally or in the alternative, wherein the shutter system includes an LCD shutter. Additionally or in the alternative, wherein the LCD shutter includes a dispersion shutter. Additionally or in the alternative, wherein the light transmitting device includes an IR reflector, the IR reflector disposed between the light source and the LCD shutter. Additionally or in the alternative, wherein the shutter system uses drive electronics to modulate the light source. Additionally or in the alternative, wherein the shutter system operates a shutter between an open state and an about 30% open state. Additionally or in the alternative, further including receiving a light signal, the light signal representative of information sent from the distant party. Additionally or in the alternative, the receiving including ascertaining the existence of the light signal. Additionally or in the alternative, the receiving including determining the existence of the light signal based upon the brightness of the signal and tracking the light signal once identified. Additionally or in the alternative, wherein the shutter system is a flashing LED set. Additionally or in the alternative, wherein the flashing LED set includes visual light LEDs, ultra-violet LEDs, and/or infrared LEDs. Additionally or in the alternative, wherein the flashing LED set includes a photodiode coupled to the rear receiver of the flashing LED set. Additionally or in the alternative, wherein the computing device simultaneously sends and receives coded messages via the light transmitting device. Additionally or in the alternative, wherein the modulating is accomplished by using drive electronics.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A light-based communications system comprising:
a light transmitting device including a light source;
a shutter system coupled to the light transmitting device;
a computing device coupled to the shutter system, the computing device including a set of instructions to:
receive a first set of information from a user; and
control the shutter system so as to modulate the output of the light source in such a way so as to transmit the first set of information to a third-party,
wherein the light transmitting device includes a housing for containing the light source, and wherein the shutter system includes a shutter, a lever coupled to the shutter, the lever operable between an open state and a closed state, and an operable mechanism coupled to a lever, the operable mechanism in electronic communication with the computing device.

2. The light-based communications system of claim 1, wherein the operable mechanism is a solenoid motor.

3. The light-based communications system of claim 2, wherein the operable mechanism includes a coupling, the coupling mechanically engaging the solenoid motor with the lever.

4. The light-based communications system of claim 3, wherein the coupling is a coupling lever.

5. The light-based communications system of claim 3, wherein the coupling is a gear coupling.

6. The light-based communications system of claim 1, wherein the operable mechanism is a stepper motor.

7. The light-based communications system of claim 1, wherein the shutter system includes an LCD shutter.

8. The light-based communications system of claim 7, wherein the LCD shutter includes a dispersion shutter.

9. The light-based communications system of claim 7, wherein the light transmitting device includes an IR reflector, the IR reflector disposed between the light source and the LCD shutter.

10. The light-based communications system of claim 1, wherein the shutter system operates a shutter between an open state and an about 30% open state.

11. The light-based communications system of claim 1, further including a receiver in electronic communication with the computing device, the receiver configured to ascertain the existence of a light signal, the light signal representative of coded information.

12. The light-based communications system of claim 11, wherein the receiver determines the existence of a light signal based upon the brightness of the signal and wherein the receiver tracks the light signal once identified.

13. The light-based communications system of claim 1, wherein the shutter system is a flashing LED set and wherein the flashing LED set includes visual light LEDs, ultra-violet LEDs, and/or infrared LEDs.

14. The light-based communications system of claim 13, wherein the flashing LED set includes a photodiode coupled to the rear receiver of the flashing LED set.

15. A method of communicating using a light source, the method comprising:
providing a light transmitting device;
entering a message to be sent to a distant third party into a computing device, the computing device in electronic communication with the light transmitting device:
converting the message into a code suitable for transmission via light; and
modulating the light transmitting device with the computing device so as to send the code to the distant third party, wherein the modulating is accomplished by using a shutter system, wherein the shutter system is one of a mechanical shutter or an electrical shutter, and wherein the light transmitting device includes a housing for containing the light source, and wherein the shutter system includes a shutter, a lever coupled to the shutter, the lever operable between an open state and a closed state, and an operable mechanism coupled to a lever, the operable mechanism in electronic communication with the computing device.

16. A method according to claim 15, wherein the operable mechanism is a solenoid motor.

17. A method according to claim 16, wherein the operable mechanism includes a coupling, the coupling mechanically engaging the solenoid motor with the lever.

18. A method according to claim 17, wherein the coupling is a coupling lever.

19. A method according to claim 17, wherein the coupling is a gear coupling.

20. A method according to claim 15, wherein the operable mechanism is a stepper motor.

21. A method according to claim 15, wherein the shutter system includes an LCD shutter.

22. A method according to claim 21, wherein the LCD shutter includes a dispersion shutter.

23. A method according to claim 21, wherein the light transmitting device includes an IR reflector, the IR reflector disposed between the light source and the LCD shutter.

24. A method according to claim 15, wherein the shutter system operates a shutter between an open state and an about 30% open state.

25. A method according to claim 15, further including receiving a light signal. the light signal representative of information sent from the distant party, the receiving including determining the existence of the light signal based upon the brightness of the signal and tracking the light signal once identified.

* * * * *